No. 657,968. Patented Sept. 18, 1900.
J. I. THORNYCROFT.
SEPARATOR FOR STEAM GENERATORS.
(Application filed May 12, 1899.)
(No Model.) 2 Sheets—Sheet 1.
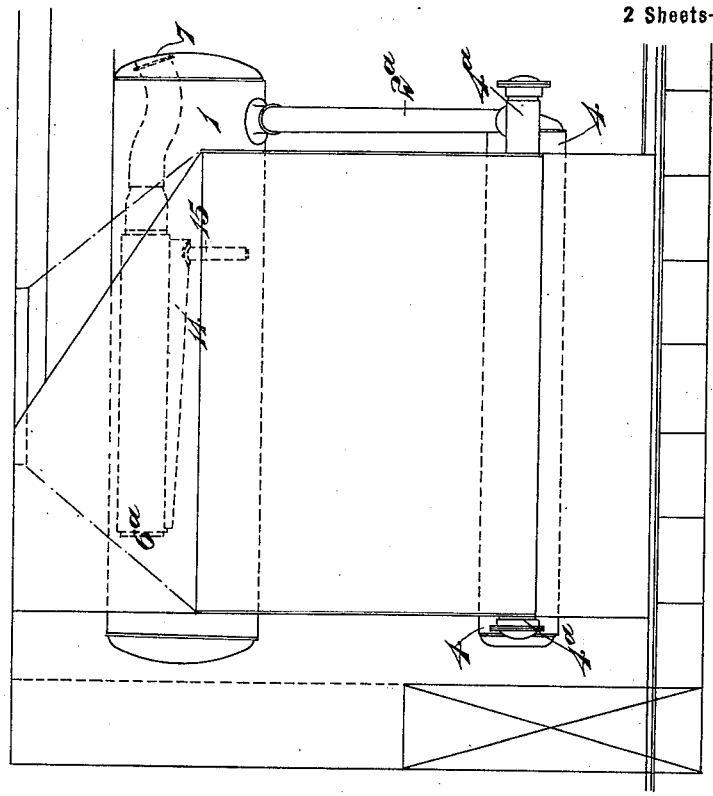
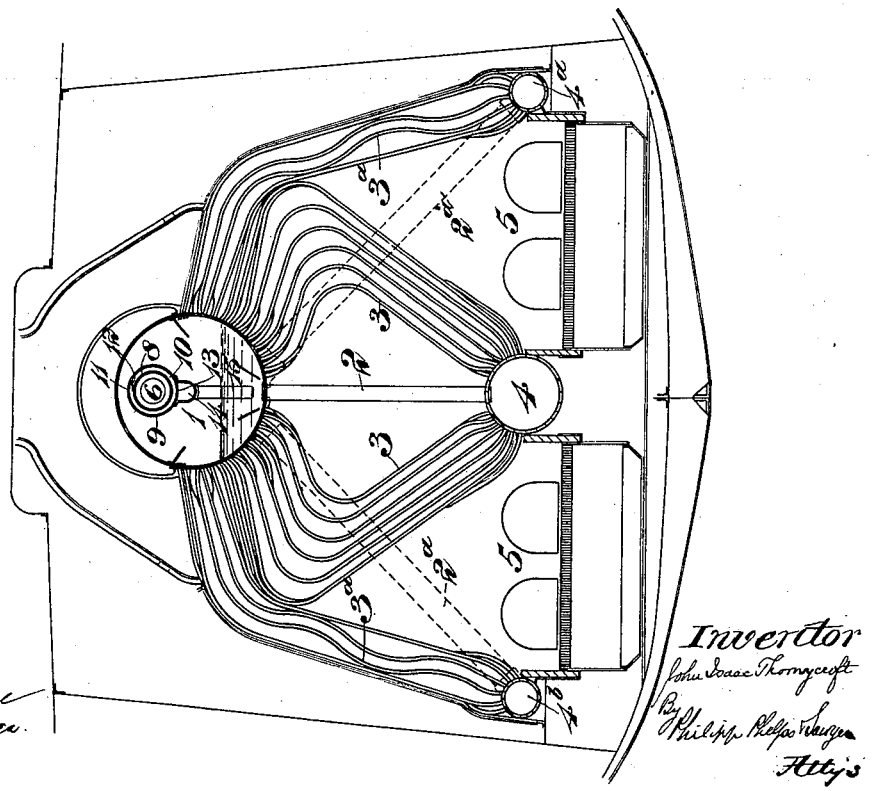

No. 657,968. Patented Sept. 18, 1900.
J. I. THORNYCROFT.
SEPARATOR FOR STEAM GENERATORS.
(Application filed May 12, 1899.)
(No Model.) 2 Sheets—Sheet 2.
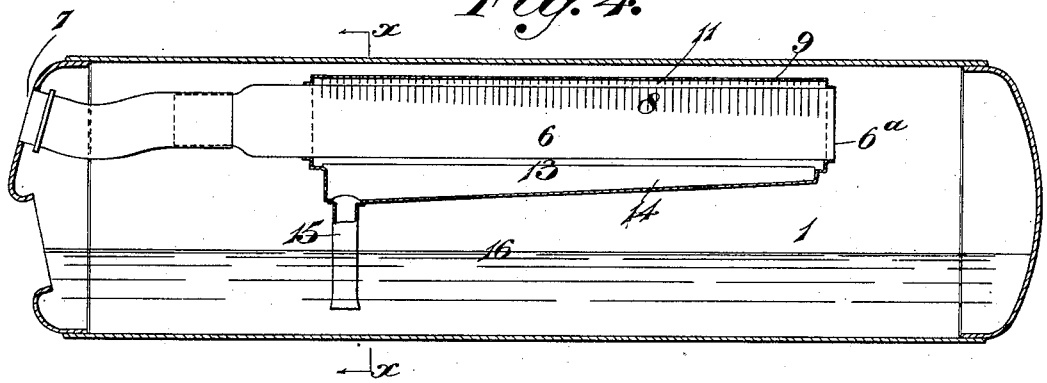
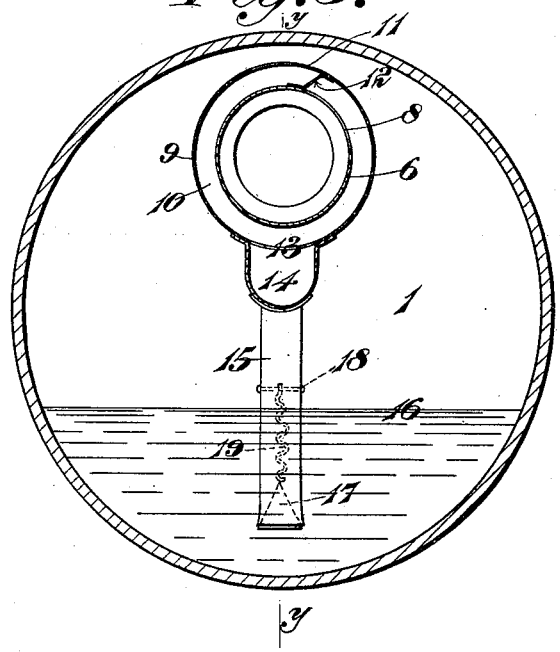

UNITED STATES PATENT OFFICE.

JOHN ISAAC THORNYCROFT, OF LONDON, ENGLAND.

SEPARATOR FOR STEAM-GENERATORS.

SPECIFICATION forming part of Letters Patent No. 657,968, dated September 18, 1900.

Application filed May 12, 1899. Serial No. 716,483. (No model.)

*To all whom it may concern:*

Be it known that I, JOHN ISAAC THORNYCROFT, a subject of the Queen of Great Britain and Ireland, residing at Church Wharf, Chiswick, London, in the county of Middlesex, England, have invented Improvements in Separators for Steam-Generators, of which the following is a specification.

The object of this invention is to facilitate the separation of water from steam, especially in steam-generators of the kind constructed with upper and lower vessels connected by downflow and upflow tubes, by which latter steam and water are delivered into the upper vessel or vessels wherein the separation takes place and whence the steam flows by the steam-main and the water descends by the downflow pipe or pipes to the lower vessels. According to this invention there is provided within the upper vessel an improved device for separating water from the steam as the same flows on its way to the steam-main, as I shall now describe by the aid of the accompanying illustrative drawings, wherein—

Figures 1 and 2 show, respectively, in cross-section and side elevation a steam-generator of the kind above referred to, the upper vessel of which is provided with a water-separating device according to this invention. Figs. 3 and 4 show the upper vessel and water-separating device to a larger scale, Fig. 3 showing the said upper vessel and water-separating device in cross-section corresponding to the line $xx$ of Fig. 4, and Fig. 4 showing the vessel in longitudinal section and the water-separating device partly in longitudinal section on the line $yy$ of Fig. 3 and partly in side elevation. Figs. 1 and 2 are drawn to a smaller scale than Figs. 3 and 4, which are drawn to different scales.

The steam-generator shown comprises an upper steam and water vessel 1, connected by central internal downtake-tubes 2 and two inner groups of steam-generating tubes 3 to a lower central water vessel 4 and by external downtake-tubes $2^a$ and two outer groups of steam-generating tubes $3^a$ to two lower water vessels $4^a$ $4^b$, arranged at the outer sides of two fire-grates 5, all as more fully described in the specification of another application of Letters Patent filed by me, Serial No. 716,484.

The water-separating device comprises a pipe 6, (hereinafter called the "inner" pipe,) which is or may be closed at the one end $6^a$ and at the other end is in communication with the steam-main 7. Through an upper side portion of the wall of the said inner pipe 6 there are fine slits or openings 8. Around and secured to the said pipe 6 there is an outer pipe or casing 9, (hereinafter called the "outer" pipe,) the arrangement being such as to form an annular space or outer chamber 10 between the two pipes, which space or chamber constitutes the chamber in which water is separated from the stem as the latter flows to the steam-main 7. Through the upper portion of the wall of the outer pipe 9 there are slits or openings 11. Within the annular space or chamber 10 there is a longitudinal partition 12, which connects the inner and outer pipes 6 and 9. The arrangement is such that the slits or openings 11 in the wall of the outer pipe 9 are just to one side of this longitudinal partition 12, while the slits or openings 8 in the wall of the inner pipe 6 are just to the other side of the said partition. In the lower part of the outer tube 9 there is or are one or more other slits or openings, as at 13, and below it or them there is a longitudinal casing or box 14, the bottom of which is inclined downard toward one end, near which it is provided with an outlet-pipe 15, extending sufficiently downward within the vessel to reach below the normal water-level 16. This outlet-pipe 15 is furnished with an automatic non-return-valve arrangement adapted to allow water to escape from the casing or box 14 through the outlet-pipe 15 to the water-space of the upper vessel 1, but to prevent water entering the casing or box from the said upper vessel through the said outlet-pipe. Wet steam from the upper vessel 1 of the boiler passes by the slits or openings 11 of the outer pipe 9 into the annular space or outer chamber 10 between the outer and inner tubes 9 and 6, travels practically entirely around the exterior of the inner pipe, so as to part with any water mixed with the steam while the steam is passing through the outer chamber, and from that chamber the steam passes by the slits or openings 8 into the inner pipe or chamber and thence to the steam-main 7. The water separated from the steam within the annular space or outer chamber descends to the before-mentioned casing or box 14 and thence by its outlet-pipe 15 into the upper vessel 1 of the boiler below the water-level therein.

The automatic non-return-valve arrangement shown in Fig. 3 comprises a conical valve 17, that closes against a seat formed at the lower end of the pipe 15, a fixed cross-pin 18, and a coiled spring 19, that connects the valve to the cross-pin and keeps the valve closed except when water accumulates in the pipe 15, so as to be above the water-level in the vessel 1, whereupon the valve is opened by the weight of the water in the said pipe 15 and allows some of that water to escape into the vessel 1, after which the valve again closes.

What I claim is—

1. A separator for separating water from steam comprising two chambers arranged one within the other, the outer chamber having a row of openings along one side thereof and having its ends closed, the inner chamber having a row of openings along one side thereof and having one end closed and the other end in communication with the steam-main, means for causing the steam to pass partly around the inner chamber before it enters the same through the openings thereof, and means for discharging the separated water from the outer chamber, substantially as described.

2. For separating water from steam in a steam-boiler, a separator comprising chambers arranged one within the other, and a water-discharge conduit connected to the lower side of the outer chamber, said outer chamber having an inlet for wet steam and an outlet in connection with said discharge-conduit through which water separated from the steam within the outer chamber can escape, and said inner chamber having an inlet for steam from the outer chamber and an outlet for connection to a steam-main, the inlets to the outer and inner chambers being separated from each other so that steam entering the outer chamber must pass partly around the inner chamber before it can enter the same.

3. For separating water from steam in a steam-boiler, a separator comprising inner and outer longitudinal chambers, a longitudinal partition secured to and between the walls of said chambers, and a water-discharge conduit connected to the outer chamber, said outer chamber having at its upper part and to one side of said partition, inlet-openings for wet steam and at its lower part an outlet for water in connection with said conduit, and said inner chamber having a series of inlet-openings at the opposite side of said partition and an outlet for connection with a steam-main.

4. For separating water from steam in a steam-boiler, a separator comprising an outer pipe provided at its upper part with inlet slits or openings for wet steam and at its lower part with an outlet for water of condensation, an inner pipe secured within the outer pipe so as to leave a practically-annular space or chamber between the two and provided at or near its upper part with a series of slits or openings for inlet of steam from said space or chamber and at one end with an outlet for connection to a steam-main, a partition secured to and between the two pipes and located between the two sets of inlet-openings therein, and a water-discharge conduit connected to the outer pipe and in communication with the water-outlet therefrom, substantially as described.

5. For separating water from steam in a steam-boiler, a separator comprising two chambers connected together through suitable openings one of the said chambers having an inlet for wet steam and an outlet for water separated from such steam within the chamber, and the other chamber having an outlet for connection to a steam-main, a water-discharge pipe in connection with the outlet from the first-mentioned chamber, and an automatic non-return-valve arrangement adapted to control said discharge-pipe.

6. For separating water from steam in a steam-boiler, a separator comprising an outer chamber having inlets for wet steam and an outlet for water of condensation, an inner chamber secured within said outer pipe and having inlets for steam from the space between the walls of the two chambers and an outlet for connection with a steam-main, a longitudinal partition secured to and between the walls of said chambers and between the steam-inlets thereof, a longitudinal casing or box secured to the outer chamber below the water-outlet therefrom, a water-outlet pipe secured to the casing or box, and an automatic non-return-valve arrangement adapted to control said discharge-pipe, substantially as described.

7. In a steam-boiler, the combination with a vessel for containing steam and water, and a steam-main therefrom, of a steam and water separator comprising an outer longitudinal chamber having at the top, inlets for wet steam and at the bottom an outlet for water, an inner longitudinal chamber secured within said outer chamber, closed at one end and secured at the other to said steam-main and having inlets for steam from the space between the two chambers, a longitudinal partition secured to and between the walls of said chambers and located between the steam-inlets thereof, a longitudinal casing or box secured to the outer chamber below the water-outlet thereof, an outlet-pipe extending from said casing or box and terminating below the water-level in said vessel, and an automatic non-return-valve arrangement adapted to control said outlet-pipe, substantially as described.

Signed at 77 Cornhill, in the city of London, England, this 21st day of April, 1899.

JOHN ISAAC THORNYCROFT.

Witnesses:
WM. V. BROWN,
HUGH HUGHES.